(12) United States Patent
Ayash et al.

(10) Patent No.: US 6,303,169 B1
(45) Date of Patent: Oct. 16, 2001

(54) ROUNDER BAR AND METHOD OF USING THE SAME

(75) Inventors: Ajwad Ayash; Marwan A. Ayash, both of Fredericksburg, VA (US)

(73) Assignee: Ayash Engineering, Inc., Fredericksberg, VA (US)

( * ) Notice: Subject to any disclaimer, the term of this patent is extended or adjusted under 35 U.S.C. 154(b) by 0 days.

(21) Appl. No.: 09/444,145

(22) Filed: Nov. 20, 1999

(51) Int. Cl.[7] .............................. A21C 11/00; A21D 6/00

(52) U.S. Cl. .................... 426/496; 425/332; 425/333; 425/364 R; 426/503; 426/512

(58) Field of Search ...................................... 426/496, 503, 426/512; 425/332, 333, 364 R, 374, 403

(56) References Cited

U.S. PATENT DOCUMENTS

| | | | | |
|---|---|---|---|---|
| 4,306,850 | * | 12/1981 | Cummins | 425/332 |
| 5,605,708 | * | 2/1997 | Cummins et al. | 425/332 |
| 5,714,178 | * | 2/1998 | Keener | 425/333 |

* cited by examiner

Primary Examiner—George C. Yeung
(74) Attorney, Agent, or Firm—Pillsbury Winthrop LLP

(57) ABSTRACT

The present invention provides a rounder bar and method of making and using the same in which, in one embodiment, the rounder portion of the rounder bar will have a shape that presents a concave shape having one of at least one flat surface and/or edge to the incoming dough. In another embodiment, the rounder bar will include at least one depression area that allows for an immediate, rather than gradual, expansion of the dough ball. This immediate expansion allows the formation of a dough ball with a more uniformly round shape and also eliminates the formation of a dimple on the resulting dough ball that exits the rounder.

37 Claims, 5 Drawing Sheets

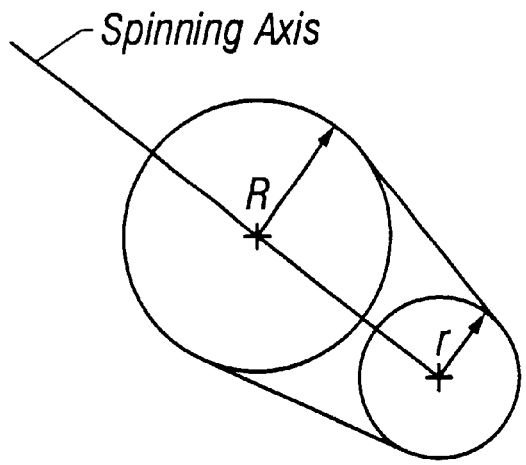
FIG. 2
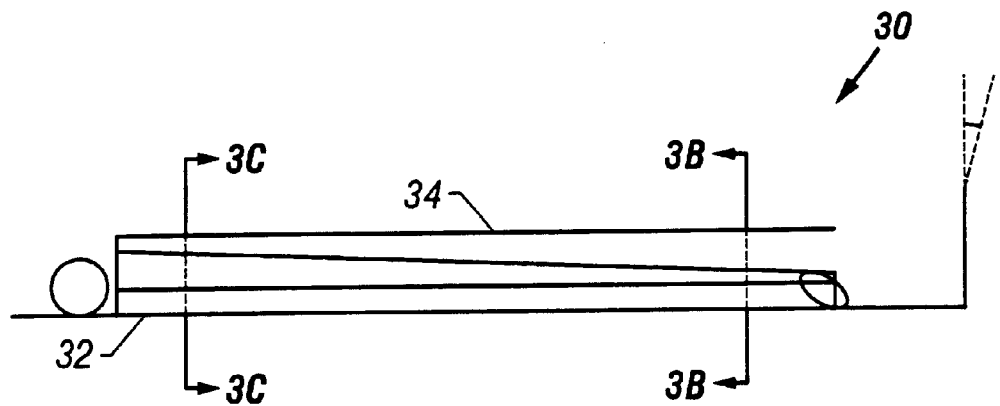
FIG. 3A
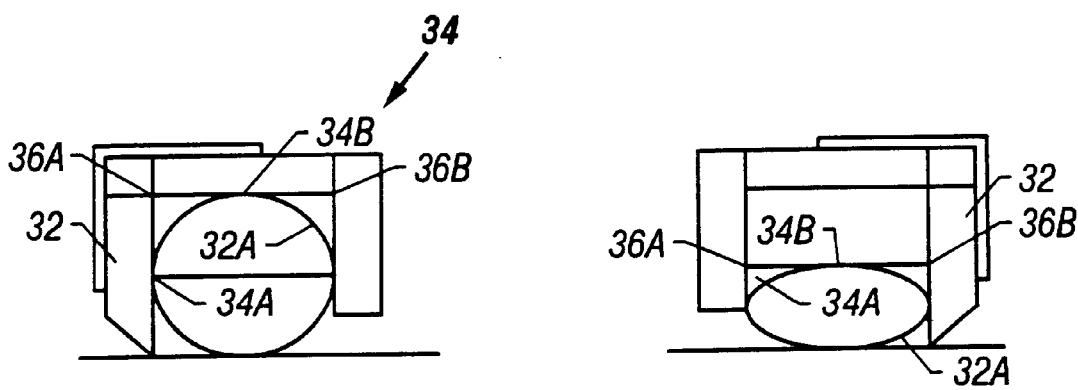
FIG. 3B  FIG. 3C

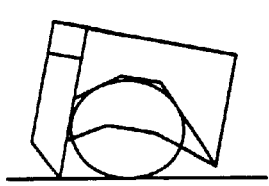
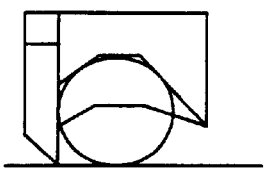
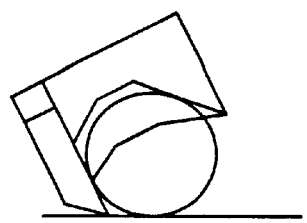
FIG. 7A  FIG. 7B  FIG. 7C
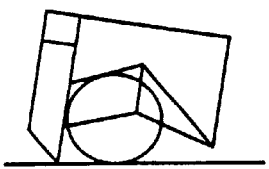
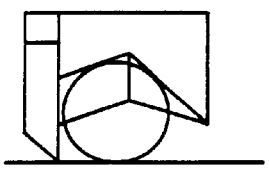
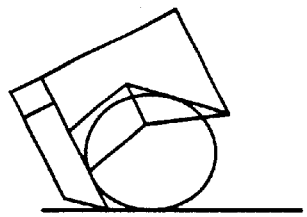
FIG. 8A  FIG. 8B  FIG. 8C
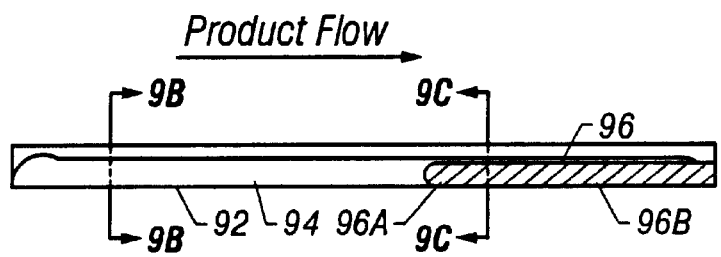
FIG. 9A
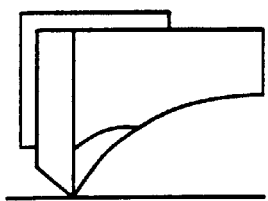
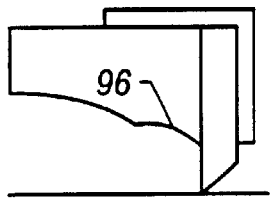
FIG. 9B  FIG. 9C

ROUNDER BAR AND METHOD OF USING THE SAME

FIELD OF THE INVENTION

The present invention relates to an improved rounder bar and methods of making and using the same.

BACKGROUND OF THE RELATED ART

In the manufacture of dough products, it is many times necessary to obtain a dough ball that has as uniformly a round shape as possible, and particularly in the manufacture of dough products on a commercial scale.

In such commercial scale manufacturing of dough products, when a dough ball that has a uniformly round shape is needed, dough that has been mixed and cut into pieces having consistent weight need to be shaped. One manner of shaping such dough is to use rounder bars disposed over a moving belt. As shown in FIG. 1A, rounder bars 10 are positioned over a moving belt 8 at an angle, typically between 10 and 15 degrees with respect to the moving belt 8. As a dough piece disposed on the belt comes in contact with any one of the rounder bars 10 (although three are shown, only one is needed and may be used), the dough is shaped due to the contact with the rounder bar 10, so that as the dough exits the rounder bar 10, still moving along the belt 8, it will have as uniform a round shape as possible.

A conventional rounder bar 10 is illustrated in more detail in FIGS. 1B and 1C. As shown, there is a blade 12 and a rounder portion 14, which are typically two different pieces. Since the tip 12A of the blade 12 will contact the moving belt during use, there is typically provided a space 14, known as the dimple gap, to accommodate for wear and tear on the blade. Thus, if the tip 12A of the blade becomes worn, it can be replaced without needing to replace the rounder portion 14. Further, the rounder portion 12, as best illustrated in FIG. 1C, has a smooth concave surface that is presented to the arriving piece of dough. This surface, however, will typically compress the dough ball in a compression area 16, and then allow the dough ball to gradually expand in expansion area 18, using substantially uniform tapering of the rounder portion 14, before exiting the rounder bar 10.

Although the conventional rounder bar 10 discussed above does improve the shape of the resulting dough ball, the shape is not improved enough for certain applications. In particular, as shown in FIG. 2, as the dough moves along the rounder bar 10, there is a spinning action that takes place of the dough ball with respect to the rounder bar 10, and a spin axis associated therewith. In particular, the resulting dough ball is not as uniform as would be desired. Further, a dimple is caused to exist on the dough ball due to the existence of the dimple gap 14 discussed above. While the existence of this dimple is not problematic for certain types of dough products, it can be for others, particularly dough balls used in the making of round tortillas.

SUMMARY OF THE INVENTION

Accordingly, it is an object of the present invention to provide for an improved rounder bar that will improve the uniform roundness of the resulting dough ball.

It is another object of the present invention to provide for an improved rounder bar that will eliminate the dimple on the resulting dough ball.

It is another object of the present invention to provide for an improved rounder bar that will both improve the uniform roundness of the resulting dough ball and eliminate any dimple from existing thereon.

In order to attain the above objects of the present invention, among others, the present invention provides various embodiments in which a rounder bar will improve the uniform roundness of the resulting dough ball.

In one embodiment, the rounder portion of the rounder bar will have a shape that presents a concave shape having one of at least one flat surface and/or edge to the incoming dough. Presenting such a surface to the incoming dough ball results in a more uniformly round shape to the resulting dough ball that exits the rounder. Specific embodiments having different surfaces are presented in more detail.

In another embodiment, the rounder bar will include at least one depression area that allows for an immediate, rather than gradual, expansion of the dough ball. This immediate expansion appears to change the spin axis of the dough ball, and thereby allow the formation of the dough ball with a more uniformly round shape to the resulting dough ball that exits the rounder. Furthermore, this depression area also eliminates the formation of a dimple on the resulting dough ball that exits the rounder.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout several views and wherein:

FIG. 2 illustrates a dough ball spin axis using a conventional rounder bar;

FIGS. 3A–3C illustrate a side view and cross sectional views taken along lines B—B and C—C of FIG. 3A respectively, of one embodiment of a rounder bar according to the present invention;

FIG. 7A–7C and 8A–8C illustrate different positions of the rounder bars illustrated in FIGS. 5A–5B and 6A–6B, respectively.

FIGS. 9A–9C illustrate respective side and cross sectional views of another embodiment of a rounder bar according to the present invention;

DETAILED DESCRIPTION OF THE PREFERRED EMBODIMENTS

Figure 1A:
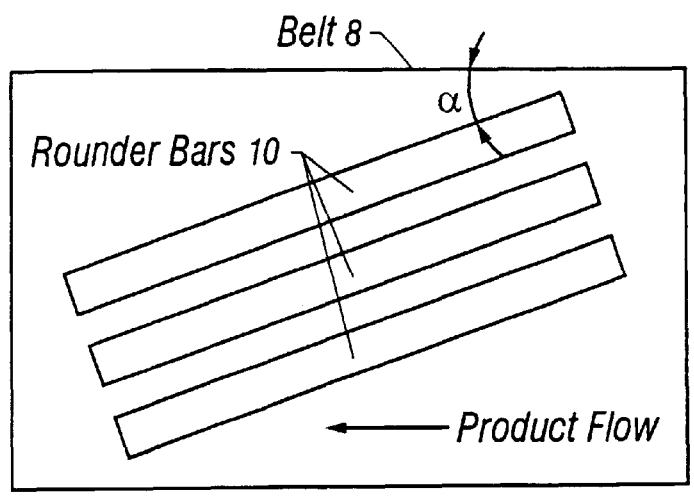
FIGS. 1A–1C illustrate a conventional rounder bar.

FIGS. 3A–3C illustrate one embodiment of the rounder according to the present invention. As shown, rounder 30 of FIGS. 3A–3C contain a blade 32 and a rounder portion 34. The blade 32 is preferably made from a food grade hard material, such as plastics or metals, for example UHMW, nylon or stainless steel and the rounder portion 34 is preferably made from the same type of material, though not necessarily the same material used to make the blade 32. Further, although the blade 32 and rounder portion 34 can be made from a single piece of material, they are preferably separable pieces that can be connected together via bolts or the like in use. The other embodiments discussed herein use the same materials for the blades and rounder portions.

The blade 32 and the rounder portion 34 of the rounder 30 shown in FIGS. 3A–3C cooperate to form a substantially U or rectangularly-shaped channel in which the dough ball will move. This channel is shown most clearly in FIGS. 3B–3C as being formed of the flat surfaces 32A from the blade 32, flat surface 34A and 34B from the rounder portion, and the edges 36 and 38 that in this embodiment result in angles of 90 degrees between the flat surfaces, as shown.

Also shown by FIGS. 3A–3C is that the area presented for the dough ball to occupy expands as the dough ball moves through the rounder bar 30. The side view of FIG. 3A illustrates the expanding area by the surfaces 32A and 34A being gradually of greater dimensions, such that as shown in FIG. 3A the surface 34B is at an angle with respect to the moving belt (not shown).

A channel shape such as this, in which a concave shape is presented to the dough ball, but there are flat surfaces and edges presented to the dough ball will assist in creating a more uniformly round shape in a consistent manner.

Figure 1B:
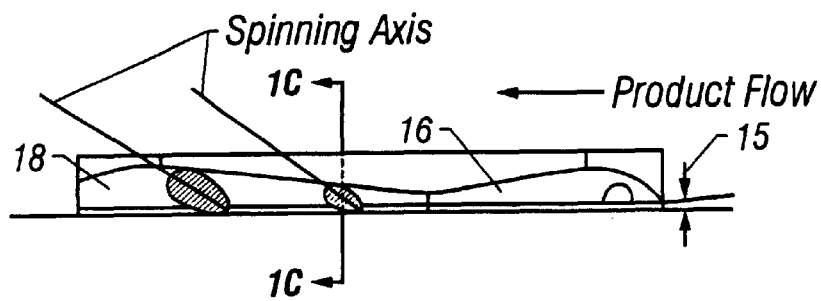
Figure 1C:
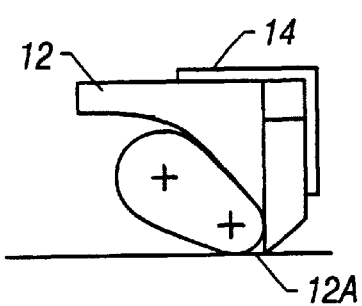
Figure 4:
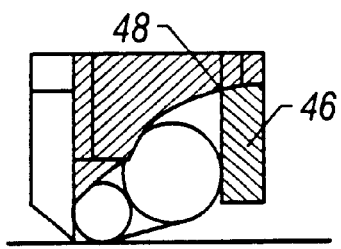
FIG. 4 illustrates a side view of another embodiment of a rounder bar according to the present invention.

FIG. 4 shows a cross section for a different rounder, but one that is taken for an rounder such as illustrated in FIG. 1. This rounder contains a rounder portion 44 that contains a gently sloping concave channel surface as in a conventional rounder, but then also includes a side bar 46 that creates an edge 48. It can be used with a rounder that performs expansion, contraction, or a combination of both, as can the other embodiments discussed herein.

Figure 5A:
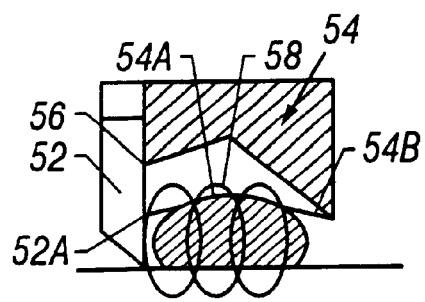
FIGS. 5A–5B illustrate cross sectional views of another embodiment of a rounder bar according to the present invention.
Figure 5B:
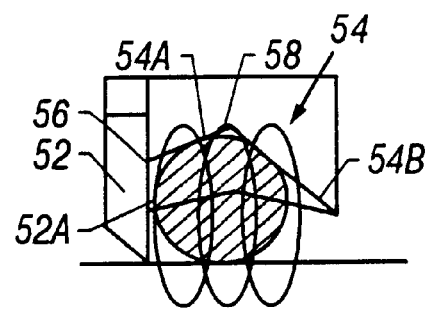

FIGS. 5A and 5B show cross sections which are for a different rounder, but are taken at the same locations as lines B—B and C—C of FIG. 3A. These cross sections illustrate that the present invention contemplates other channel shapes formed of combinations of flat surfaces and edges as various angles. For example, in the embodiment of FIGS. 5A and 5B, there are also two edges 56 and 58 created from the flat surfaces 52A of the blade 52 and flat surfaces 54A and 54B of rounder portion 54, but the angle created at edges 56 and 58 are greater than 90 degrees. This results in a trough shaped channel. It should be understood, however, that edges creating channel shapes having angles that are less than 90 degrees are also contemplated.

Figure 6A:
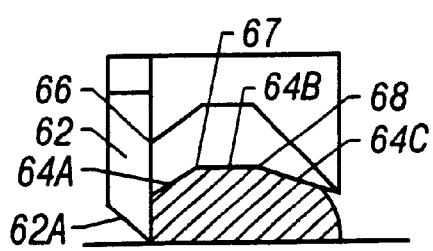
FIGS. 6A–6B illustrate cross sectional views of another embodiment of a rounder bar according to the present invention.
Figure 6B:
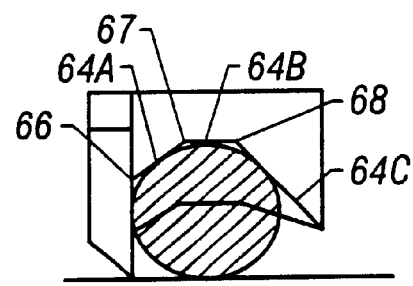

In the embodiment shown by FIGS. 6A and 6B, which are cross sections for a different rounder, but are taken at the same locations as lines B—B and C—C of FIG. 3A, there are 3 edges 66, 67 and 68 created from the flat surfaces 62A of the blade 62 and flat surfaces 64A, 64B, and 64C of rounder portion 64, but the angle created at edges 66, 67, and 68 are greater than 90 degrees. This results in an additional edge being created in comparison to the embodiment of FIGS. 5A and 5B.

FIG. 7A–7C and 8A–8C illustrate different positions of the rounder bars illustrated in FIGS. 5A–5B and 6A–6B, respectively. In the positions shown in FIGS. 7A and 8A, the rounder is positioned to make a relatively small dough ball, in the positions shown in FIGS. 7C and 8C the rounder is positioned to make a relatively large dough ball, and in the positions shown in FIGS. 7B and 8B the dough ball is a medium size between that of the large and small size discussed hereinbefore.

FIGS. 9A and 9B illustrate another embodiment of the present invention, in which the rounder is made so that there exists a blade 92 and on the rounder portion 94 at least one depression area 96 that allows for an immediate, rather than gradual, expansion of the dough ball. The depression area allows for an accelerated expansion of the dough as it moves into the depression area 96 formed in the channel, which can also be viewed as allowing for the dough to change in its shape from that of a cone to a more spherical shape, as discussed further hereinafter, from the preceding portion of the channel that does not contain the depression area 96. This immediate expansion appears to change the spin axis of the dough ball, and thereby allow the formation of the dough ball with a more uniformly round shape to the resulting dough ball that exits the rounder. Furthermore, this depression area 96 also eliminates the formation of a dimple on the resulting dough ball that exits the rounder.

Though the depression area 96 is illustrated as a gently sloping concave surface in FIG. 9B when looked at in cross sectional view, the depression area can also have other shapes with edges and flat faces, such as a trough, V shape and the like. Further, the overall peripheral shape of the depression area 96 can vary. As shown in FIG. 9A, the depression area 96 is created along a substantial portion of the rounder portion 94 and is maintained for the remainder of the dough path.

Figure 10:
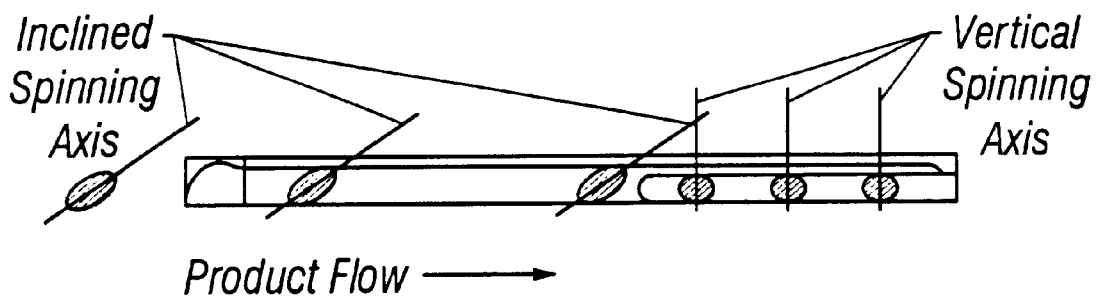
FIG. 10 illustrates the movement of dough within the rounder bar of the embodiment illustrated in FIGS. 9A–9C.

FIG. 10 illustrates the movement of the dough ball through the rounder having the blade 92, the rounder portion 94, and depression area 96, and the resulting more uniform round shape at the exit thereof. It should be noted that prior to the dough ball being in the depression area 96. it will have a cone shape, with the spin axis being generally as shown, and typically in the range of 30 to 70 degrees. It is believed that this cone shape that results in the dimple being caused in the dough ball upon its exit from the rounder. Once, however, the dough ball enters the depression area, its shape changes to a much more spherical or rounder shape. It is believed that this is due to the change in the spin axis that is between 80 and 110 degrees. Accordingly, the presence of the depression area 96 results in a dough ball that is much rounder or spherical, and also does not contain the undesired dimple.

Figure 11:
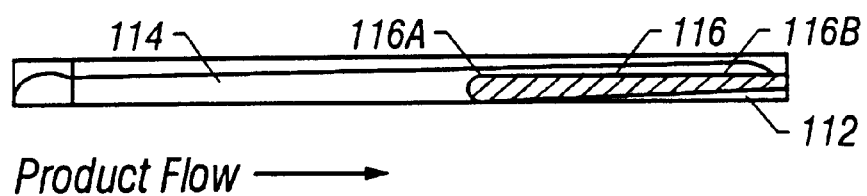
FIGS. 11 and 12 illustrate side views of other embodiments of a rounder bar according to the present invention.

In contrast to the overall peripheral shape of the depression area 96 illustrate in FIG. 9, as shown in FIG. 11, although there exists a depression area 116 and the dough is presented with an initial depression area 116A that is generally of the same dimensions as the depression area 96A shown in FIG. 9A, the depression area 116 peripheral shape expands, thereby, for the view shown, exposing the blade 112, as shown by depression area 116B in FIG. 11. This is intended to illustrate that the overall peripheral shape of the depression area can vary and still provide the advantages that are contemplated by the present invention.

Figure 12:
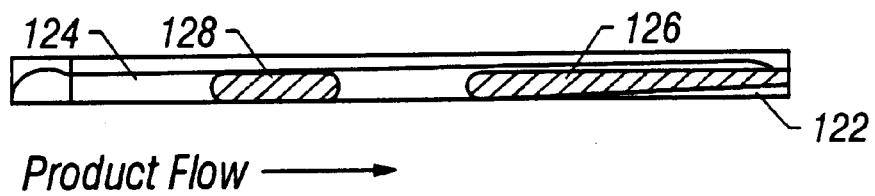

Furthermore, as shown in FIG. 12, there can be more than one depression area within a rounder. As shown, there exists depression areas 126 and 128, which as illustrated are of different sizes, but the invention is not limited thereto, and is not limited to only one or two depression areas, as three or more could also be included.

It should also be noted that the depression area is shown in a rounder that essentially allows for gradual expansion of the dough to take place. The usage of a depression area is not however limited to a rounder that only allows for gradual expansion, but also rounders that provide for both gradual contraction and gradual expansion of the dough ball during movement therethrough, as discussed above.

The invention described above is useful for a variety of different dough products, but as been found especially useful for making dough balls needed in making tortillas.

While the present invention has been described herein with reference to particular embodiments thereof, a latitude of modification, various changes and substitutions are intended in the foregoing disclosure, and it will be appreciated that in some instances some features of the invention will be employed without a corresponding use of other features without departing from the spirit and scope of the invention as set forth in the appended claims.

We claim:

1. A rounder bar through which a dough ball will move therethrough comprising:
   a blade;
   a rounder portion aligned with the blade provides a channel for the dough ball to move therethrough; and
   a depression formed in the channel, the depression allowing for an accelerated expansion of the dough as it moves into the depression formed in the channel.

2. The rounder bar according to claim 1 wherein a cross sectional shape of the depression is a smooth concave surface.

3. The rounder bar according to claim 2 wherein a peripheral shape of the depression does not provide for further expansion.

4. The rounder bar according to claim 2 wherein a peripheral shape of the depression provides for further gradual expansion.

5. The rounder bar according to claim 1 wherein a peripheral shape of the depression does not provide for further expansion.

6. The rounder bar according to claim 1 wherein a peripheral shape of the depression provides for further gradual expansion.

7. The rounder bar according to claim 1 wherein a cross sectional shape of the depression contains at least a flat surface.

8. The rounder bar according to claim 1 wherein a cross sectional shape of the depression area is a trough.

9. The rounder bar according to claim 1 further including a second depression and wherein a cross sectional shape of the depression is a trough.

10. The rounder bar according to claim 9 wherein the shape of the depression and the second depression are different.

11. The rounder bar according to claim 1 wherein the depression allows for an expansion in the size of the dough ball of at least 5% from a preceding portion of the channel.

12. The rounder bar according to claim 1 wherein the rounder portion is connectable with the blade such that when connected the rounder portion is aligned with the blade.

13. The rounder bar according to claim 12 wherein the depression is formed on the rounder portion.

14. A method of obtaining a dough ball of substantially uniform round shape comprising the steps of:
   moving the dough ball along a surface on a rounder that is provided at an angle to a moving belt, the dough ball having a substantially conical shape as it initially moves along the surface; and
   providing a depression on the surface such that the depression allows for the dough ball to change from the substantially conical shape to a more uniformly spherical shape as it moves into the depression formed in the surface.

15. The method according to claim 14 wherein the depression is formed in an area of the surface that otherwise provides for gradual expansion of the dough ball.

16. The method according to claim 14 wherein the depression is formed in an area of the surface that otherwise provides for gradual contraction of the dough ball.

17. The method according to claim 14 wherein the dough ball moves along the surface on a spin axis; and wherein the spin axis of the dough ball substantially changes when the dough ball moves into the depression.

18. The method according to claim 14 further comprising the step of forming the dough ball into a tortilla.

19. A rounder bar through which a dough ball will move therethrough comprising:
   a blade;
   a rounder portion aligned with the blade that provides a channel for the dough ball to move therethrough, the channel having at least one flat surface formed on the rounder portion; and
   a depression formed in the channel, the depression allowing for an accelerated expansion of the dough as it moves into the depression formed in the channel.

20. The rounder bar according to claim 19 wherein the channel further includes an edge formed on the rounder portion.

21. The rounder bar according to claim 20 wherein the edge forms an angle of substantially 90 degrees.

22. The rounder bar according to claim 20 wherein the edge forms an angle that is greater than 90 degrees.

23. The rounder bar according to claim 19 wherein the channel has a V shape, with one side of the V shape being flat.

24. The rounder bar according to claim 19 wherein the channel has a trough shape.

25. The rounder bar according to claim 19 wherein the channel has at least two flat surfaces and two edges formed on the rounder portion.

26. The rounder bar according to claim 19 wherein the rounder portion is connectable with the blade such that when connected the rounder portion is aligned with the blade.

27. The rounder bar according to claim 19 wherein a cross sectional shape of the depression is a smooth concave surface.

28. The rounder bar according to claim 27 wherein a peripheral shape of the depression does not provide for further expansion.

29. The rounder bar according to claim 27 wherein a peripheral shape of the depression provides for further gradual expansion.

30. The rounder bar according to claim 19 wherein a peripheral shape of the depression does not provide for further expansion.

31. The rounder bar according to claim 19 wherein a peripheral shape of the depression provides for further gradual expansion.

32. The rounder bar according to claim 19 wherein a cross sectional shape of the depression contains at least a flat surface.

33. The rounder bar according to claim 19 wherein a cross sectional shape of the depression area is a trough.

34. The rounder bar according to claim 19 further including a second depression and wherein a cross sectional shape of the depression is a trough.

35. The rounder bar according to claim 34 wherein the shape of the depression and the second depression are different.

36. The rounder bar according to claim 19 wherein the depression allows for an expansion in the size of the dough ball of at least 5% from a preceding portion of the channel.

37. The rounder bar according to claim 19 wherein the depression is formed on the rounder portion.

* * * * *